US012111612B2

(12) United States Patent
Sekido et al.

(10) Patent No.: US 12,111,612 B2
(45) Date of Patent: Oct. 8, 2024

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Kunihiko Sekido, Shizuoka (JP); Masashi Nishi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/342,214

(22) Filed: Jun. 27, 2023

(65) Prior Publication Data

US 2023/0350314 A1 Nov. 2, 2023

Related U.S. Application Data

(62) Division of application No. 17/223,795, filed on Apr. 6, 2021, now Pat. No. 11,726,414.

(30) Foreign Application Priority Data

Apr. 13, 2020 (JP) ................................ 2020-071958

(51) Int. Cl.
*G03G 5/043* (2006.01)
*G03G 5/10* (2006.01)
*G03G 8/00* (2006.01)

(52) U.S. Cl.
CPC .......... *G03G 5/0436* (2013.01); *G03G 5/102* (2013.01); *G03G 8/00* (2013.01)

(58) Field of Classification Search
CPC .. G03G 5/14791; G03G 5/0436; G03G 5/102; G03G 8/00
See application file for complete search history.

(56) References Cited

U.S. PATENT DOCUMENTS

| | | | | |
|---|---|---|---|---|
| 5,604,061 | A | 2/1997 | Sekido et al. | |
| 5,955,250 | A * | 9/1999 | Christian | G03C 1/85 430/528 |
| 6,228,546 | B1 | 5/2001 | Kashizaki et al. | |
| 7,141,341 | B2 | 11/2006 | Sekido et al. | |
| 8,343,699 | B2 | 1/2013 | Nagasaka et al. | |
| 8,465,889 | B2 | 6/2013 | Sekido et al. | |
| 8,524,430 | B2 | 9/2013 | Takagi et al. | |
| 8,546,050 | B2 | 10/2013 | Maruyama et al. | |
| 8,632,931 | B2 | 1/2014 | Sekido et al. | |
| 8,795,936 | B2 | 8/2014 | Sekido et al. | |
| 9,029,054 | B2 | 5/2015 | Okuda et al. | |
| 9,063,505 | B2 | 6/2015 | Sekiya et al. | |
| 9,069,267 | B2 | 6/2015 | Kaku et al. | |
| 9,164,406 | B2 | 10/2015 | Nishi et al. | |
| 9,207,550 | B2 | 12/2015 | Okuda et al. | |
| 9,280,072 | B2 | 3/2016 | Ogaki et al. | |
| 9,335,645 | B2 | 5/2016 | Tagami et al. | |
| 9,442,401 | B2 | 9/2016 | Sekido et al. | |
| 9,477,163 | B2 | 10/2016 | Nishi et al. | |
| 9,760,030 | B2 | 9/2017 | Sekiya et al. | |
| 9,772,568 | B2 | 9/2017 | Sekido et al. | |
| 9,811,011 | B2 | 11/2017 | Nishi et al. | |
| 9,851,648 | B2 | 12/2017 | Nishi et al. | |
| 9,864,285 | B2 | 1/2018 | Nishi et al. | |
| 9,921,498 | B2 | 3/2018 | Sekido et al. | |
| 10,372,050 | B2 | 8/2019 | Nishi et al. | |
| 2008/0318147 | A1 | 12/2008 | Fujita | |
| 2018/0246427 | A1 | 8/2018 | Kaku | |
| 2018/0246441 | A1 | 8/2018 | Anezaki | |
| 2018/0335707 | A1* | 11/2018 | Maeda | G03G 5/14704 |
| 2020/0124997 | A1 | 4/2020 | Matsusaki | |
| 2021/0318629 | A1 | 10/2021 | Nishi | |

FOREIGN PATENT DOCUMENTS

| | | | |
|---|---|---|---|
| EP | 3 367 167 | A1 | 8/2018 |
| JP | 2005-17470 | A | 1/2005 |
| JP | 2007-334334 | A | 12/2007 |
| JP | 2009-3235 | A | 1/2009 |
| JP | 2009229495 | A * | 10/2009 |
| JP | 2015-22297 | A | 2/2015 |
| JP | 2015-114453 | A | 6/2015 |
| JP | 2018-141974 | A | 9/2018 |
| JP | 2018-194799 | A | 12/2018 |
| JP | 2020-30384 | A | 2/2020 |

(Continued)

OTHER PUBLICATIONS

English machine translation of the description of JP-2009229495-A (Year: 2009).*

(Continued)

*Primary Examiner* — Peter L Vajda
*Assistant Examiner* — Boone Alexander Evans
(74) *Attorney, Agent, or Firm* — VENABLE LLP

(57) ABSTRACT

An electrophotographic photosensitive member capable of maintaining a charging ability during repeated use is provided. An electrophotographic photosensitive member having a support, a conductive layer, a photosensitive layer and a protective layer in this order, wherein the protective layer contains a binding resin and a metal oxide particle, the metal oxide particle has a core and a coating layer, the core and the coating layer each contain titanium oxide, and the coating layer further includes niobium.

13 Claims, 1 Drawing Sheet

(56) References Cited

FOREIGN PATENT DOCUMENTS

| | | | |
|---|---|---|---|
| JP | 2020-34903 | A | 3/2020 |
| JP | 2020-67502 | A | 4/2020 |

OTHER PUBLICATIONS

Manabu Kiyono, Titanium Oxide-Physical Properties and Applied Techniques, 2nd Ed., Table 4.3, Titanium Oxide Research Group (2017) 52.

Acrylated dipentaerythritol Technical Data Sheet, Allnex (2020) 1-2.

1-Hydroxycyclohexyl (phenyl) ketone Safety Data Sheet, Ver. 6.2, Sigma-Aldrich (2022) 1-8.

* cited by examiner

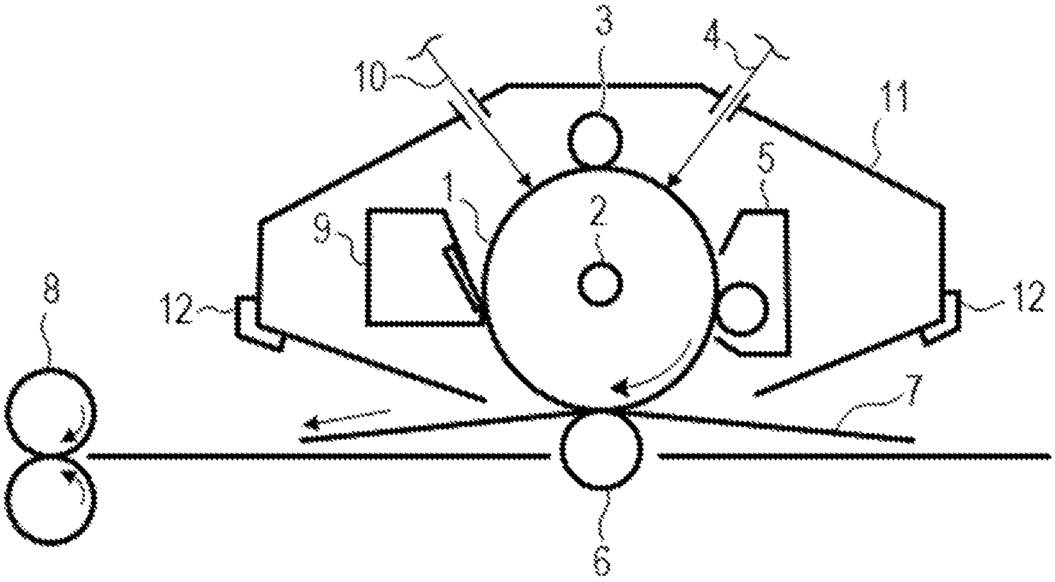
1
2
3
4
5
6
7
8
9
10
11
12
12

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present invention relates to an electrophotographic photosensitive member, a process cartridge and an electrophotographic apparatus having the electrophotographic photosensitive member.

Description of the Related Art

In an electrophotographic photosensitive member for use in an electrophotographic apparatus, for the purposes of lengthening a lifetime of the electrophotographic photosensitive member and improving image quality during repeated use, providing a protective layer is known in order to improve mechanical durability (wear resistance).

In Japanese Patent Application Laid-Open No. 2009-229495, in order to improve the electric characteristics of an electrophotographic photosensitive member using such a protective layer, addition of titanium oxide in the protective layer is known.

SUMMARY OF THE INVENTION

According to the investigation of the present inventors, it has been found that the electrophotographic photosensitive member described in Japanese Patent Application Laid-Open No. 2009-229495 leaves room for improvement in maintaining a charging ability during repeated use.

Accordingly, it is an object of the present invention to provide an electrophotographic photosensitive member capable of maintaining a charging ability during repeated use.

The above object is achieved by the following present invention.

That is, a first aspect of the present invention is an electrophotographic photosensitive member comprising a support, a conductive layer, a photosensitive layer and a protective layer in this order, wherein the protective layer comprises a binding resin and a metal oxide particle, the metal oxide particle comprises a core and a coating layer coating the core, the core comprises titanium oxide, the coating layer comprises titanium oxide and niobium, and the abundance ratio of the niobium based on the total mass of the coating layer is higher than the abundance ratio of the niobium based on the total mass of the core.

A second aspect of the present invention is an electrophotographic photosensitive member comprising a support, a conductive layer, a photosensitive layer and a protective layer in this order, wherein, the protective layer comprises a binding resin and a metal oxide particle, the metal oxide particle comprises a core and a coating layer coating the core, the core comprises titanium oxide, the coating layer comprises titanium oxide, and when the oxygen deficiency rate of the metal oxide particle is denoted by A (%), the oxygen deficiency rate of the core is denoted by B (%) and the oxygen deficiency rate of the coating layer is denoted by C (%), the following expression (1) and expression (2) are satisfied.

$$A \leq 2.0 \quad (1)$$

$$10 \times B < C \quad (2)$$

According to the first aspect or the second aspect of the present invention, an electrophotographic photosensitive member having a good charging ability can be provided.

Further features of the present invention will become apparent from the following description of exemplary embodiments with reference to the attached drawing.

BRIEF DESCRIPTION OF THE DRAWINGS

FIG. 1s a schematic construction view of an electrophotographic apparatus including a process cartridge having an electrophotographic photosensitive member.

DESCRIPTION OF THE EMBODIMENTS

Preferred embodiments of the present invention will now be described in detail in accordance with the accompanying drawing.

As a result of an investigation, the present inventors have found that a photosensitive member including a metal oxide particle containing titanium oxide used in the conventional art and added in the protective layer leaves room for improvement in maintaining a charging ability during repeated use.

When an investigation was made in order to solve technical problems that have occurred in the conventional art, it has been found that, as described in the first aspect of the present invention, causing a metal oxide particle containing titanium oxide in the core and the coating layer to contain niobium in the coating layer can solve the technical problems.

As described in the second aspect of the present invention, it has been found that, in a metal oxide containing titanium oxide in the core and the coating layer, when the oxygen deficiency rates have a specific relationship, the technical problems that had occurred in the conventional art can be solved.

Although the reason for this has not been clearly clarified, the present inventors think as follows.

As in the first aspect, when a metal oxide particle generally containing titanium oxide contains niobium as another element having a different atomic valence, the electrical conductivity increases, but a site in which niobium is present will have a high polarity. Thus, if much niobium is present in the site, the site functions as a trap, and electric characteristics such as a residual charge may deteriorate.

However, when the protective layer has a metal oxide particle in which niobium is preferentially present in the coating layer of the metal oxide particle containing titanium oxide (the abundance ratio of the niobium is higher in the coating layer than in the core), conductive paths in the protective layer are more likely to be connected. As a result, a charge will be unlikely to remain in the protective layer, and thus the charging ability can be prevented from degrading.

As in the second aspect, when a metal oxide particle generally containing titanium oxide has an oxygen deficiency in the crystal structure, the electrical conductivity increases. However a site having an oxygen deficiency will have a high polarity, and if many oxygen deficiencies exist, the site functions as a trap. Then, electric characteristics such as a residual charge deteriorate.

However, when the protective layer has a metal oxide particle containing titanium oxide, which metal oxide particle has a specific relationship among the oxygen deficiency rates of the metal oxide particle, the core and the coating layer, conductive paths in the protective layer are connected and a charge is more unlikely to remain in the protective layer. Thus, the charging ability can be prevented from degrading.

It is conceived that the metal oxide particle of the present invention is required to contain titanium oxide each in the core and the coating layer in view of the stability and uniformity of conductive path performance on which each particle acts.

As the above mechanism, the constituents each organically act on one another in the protective layer having a binding resin to thereby enable effects of the present invention to be achieved.

[Electrophotographic Photosensitive Member]

An electrophotographic photosensitive member of the present invention includes a support, a conductive layer, a photosensitive layer and a protective layer.

A method for producing the electrophotographic photosensitive member of the present invention is, for example, a method including preparing coating liquids for the respective layers to be described below, applying the liquids in a desired order of layer, and drying the liquids. At this time, examples of a method for applying the coating liquids include dip coating, spray coating, inkjet coating, roll coating, die coating, blade coating, curtain coating, wire bar coating and ring coating. Of those, dip coating is preferred in view of efficiency and productivity.

Each of the layers will be described below.

<Support>

In the present invention, the electrophotographic photosensitive member has a support. In the present invention the support is preferably a conductive support having conductivity. Examples of the shape of the support include a cylindrical shape, a belt shape and a sheet shape. Of those, a cylindrical support is preferred. In addition, the surface of the support may be subjected to an electrochemical treatment such as anodization, a blast treatment, or a cutting treatment.

A metal, a resin, glass, or the like is preferred as a material for the support.

Examples of the metal include aluminum, iron, nickel, copper, gold, stainless steel and alloys thereof. Of those, an aluminum support using aluminum is preferred.

Conductivity may be imparted to the resin or the glass through a treatment of mixing or coating the resin or the glass with a conductive material, for example.

<Conductive Layer>

In the present invention, a conductive layer is provided on the support. Providing the conductive layer can conceal flaws and irregularities on the surface of the support and control the reflection of light on the surface of the support.

The conductive layer preferably contains a conductive particle and a resin.

Examples of a material for the conductive particle include a metal oxide, a metal, and carbon black.

Examples of the metal oxide include zinc oxide, aluminum oxide, indium oxide, silicon oxide, zirconium oxide, tin oxide, titanium oxide, magnesium oxide, antimony oxide and bismuth oxide. Examples of the metal include aluminum, nickel, iron, nichrome, copper, zinc and silver.

Of those, a metal oxide is preferably used as the conductive particle and in particular, titanium oxide, tin oxide and zinc oxide are more preferably used.

When the metal oxide is used as the conductive particle, the surface of the metal oxide may be treated with a silane coupling agent or the like, or the metal oxide may be doped with an element, such as phosphorus or aluminum or an oxide thereof.

The conductive particle also may be of a laminated construction having a core particle and a coating layer coating the particle. Examples of the core particle include titanium oxide, barium sulfate, and zinc oxide. Examples of the coating layer include a metal oxide such as tin oxide.

When the metal oxide is used as the conductive particle, the volume-average particle size thereof is preferably 1 nm or more and 500 nm or less, more preferably 3 nm or more and 400 nm or less.

Examples of the resin include a polyester resin, a polycarbonate resin, a polyvinyl acetal resin, an acrylic resin, a silicone resin, an epoxy resin, a melamine resin, a polyurethane resin, a phenol resin and an alkyd resin.

The conductive layer may further contain a concealing agent, such as a silicone oil, a resin particle or titanium oxide.

The average thickness of the conductive layer is preferably 1 μm or more and 50 μm or less, particularly preferably 3 μm or more and 40 μm or less.

The conductive layer may be formed by preparing a coating liquid for a conductive layer containing the above-mentioned respective materials and a solvent, forming a coat of the liquid, and drying the coat. Examples of the solvent to be used for the coating liquid include an alcohol-based solvent, a sulfoxide-based solvent, a ketone-based solvent, an ether-based solvent, an ester-based solvent and an aromatic hydrocarbon-based solvent. Examples of a dispersion method for dispersing the conductive particle in the coating liquid for a conductive layer include methods using a paint shaker, a sand mill, a ball mill or a liquid collision-type high-speed disperser.

<Undercoat Layer>

In the present invention, an undercoat layer may be provided on the conductive layer. Providing the undercoat layer can improve an adhesive function between layers to impart a charge injection-inhibiting function.

The undercoat layer preferably contains a resin. The undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide imide resin and a cellulose resin.

Examples of the polymerizable functional group included in the monomer having a polymerizable functional group include an isocyanate group, a blocked isocyanate group, a methylol group, an alkylated methylol group, an epoxy group, a metal alkoxide group, a hydroxyl group, an amino group, a carboxyl group, a thiol group, a carboxylic acid anhydride group and a carbon-carbon double bond group.

The undercoat layer may further contain an electron-transporting substance, a metal oxide, a metal, a conductive polymer, and the like for the purpose of improving electric characteristics. Of those, an electron-transporting substance and a metal oxide are preferably used.

Examples of the electron-transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound and a boron-containing compound. An electron-transporting substance having a polymerizable functional group may be used as the electron-transporting substance and copolymerized with the above-mentioned monomer having a polymerizable functional group to form an undercoat layer as a cured film.

Examples of the metal oxide include indium tin oxide, tin oxide, indium oxide, titanium oxide, zinc oxide, aluminum oxide and silicon dioxide. Examples of the metal include gold, silver and aluminum.

The undercoat layer may further contain an additive.

The average thickness of the undercoat layer is preferably 0.1 μm or more and 50 μm or less, more preferably 0.2 μm or more and 40 μm or less, particularly preferably 0.3 μm or more and 30 μm or less.

The undercoat layer may be formed by preparing a coating liquid for an undercoat layer containing the above-mentioned respective materials and a solvent, forming a coat of the liquid, and drying and/or curing the coat. Examples of the solvent to be used for the coating liquid include an alcohol-based solvent, a ketone-based solvent, an ether-based solvent, an ester-based solvent and an aromatic hydrocarbon-based solvent.

<Photosensitive Layer>

The photosensitive layers of electrophotographic photosensitive members are mainly classified into (1) a laminated photosensitive layer and (2) a single-layer photosensitive layer. (1) The laminated photosensitive layer has a charge-generating layer containing a charge-generating substance and a charge-transporting layer containing a charge-transporting substance. (2) The single-layer photosensitive layer has a photosensitive layer containing both a charge-generating substance and a charge-transporting substance.

(1) Laminated Photosensitive Layer

The laminated photosensitive layer has the charge-generating layer and the charge-transporting layer.

(1-1) Charge-Generating Layer

The charge-generating layer preferably contains the charge-generating substance and a resin.

Examples of the charge-generating substance include an azo pigment, a perylene pigment, a polycyclic quinone pigment, an indigo pigment and a phthalocyanine pigment. Of those, an azo pigment and a phthalocyanine pigment are preferred. Of the phthalocyanine pigments, an oxytitanium phthalocyanine pigment, a chlorogallium phthalocyanine pigment and a hydroxygallium phthalocyanine pigment are preferred.

The content of the charge-generating substance in the charge-generating layer is preferably 40% by mass or more and 85% by mass or less, more preferably 60% by mass or more and 80% by mass or less based on the total mass of the charge-generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin and a polyvinyl chloride resin. Of those, a polyvinyl butyral resin is more preferred.

The charge-generating layer may further contain an additive, such as an antioxidant or a UV absorber. Specific examples thereof include a hindered phenol compound, a hindered amine compound, a sulfur compound, a phosphorus compound and a benzophenone compound.

The average thickness of the charge-generating layer is preferably 0.1 μm or more and 1 μm or less, more preferably 0.15 μm or more and 0.4 μm or less.

The charge-generating layer may be formed by preparing a coating liquid for a charge-generating layer containing the above-mentioned respective materials and a solvent, forming a coat of the liquid, and drying the coat. Examples of the solvent to be used for the coating liquid include an alcohol-based solvent, a sulfoxide-based solvent, a ketone-based solvent, an ether-based solvent, an ester-based solvent and an aromatic hydrocarbon-based solvent.

(1-2) Charge-Transporting Layer

The charge-transporting layer preferably contains the charge-transporting substance and a resin.

Examples of the charge-transporting substance include a polycyclic aromatic compound, a heterocyclic compound, a hydrazone compound, a styryl compound, an enamine compound, a benzidine compound, a triarylamine compound and a resin having a group derived from each of the substances. Of those, a triarylamine compound and a benzidine compound are preferred.

The content of the charge-transporting substance in the charge-transporting layer is preferably 25% by mass or more and 70% by mass or less, more preferably 30% by mass or more and 55% by mass or less based on the total mass of the charge-transporting layer.

Examples of the resin include a polyester resin, a polycarbonate resin, an acrylic resin and a polystyrene resin. Of those, a polycarbonate resin and a polyester resin are preferred. A polyarylate resin is particularly preferred as the polyester resin. The content ratio (mass ratio) between the charge-transporting substance and the resin is preferably from 4:10 to 20:10, more preferably from 5:10 to 12:10.

The charge-transporting layer may contain an additive, such as an antioxidant, a UV absorber, a plasticizer, a leveling agent, a lubricity-imparting agent or a wear resistance-improving agent. Specific examples thereof include a hindered phenol compound, a hindered amine compound, a sulfur compound, a phosphorus compound, a benzophenone compound, a siloxane-modified resin, a silicone oil, a fluorine resin particle, a polystyrene resin particle, a polyethylene resin particle, a silica particle, an alumina particle and a boron nitride particle.

The average thickness of the charge-transporting layer is preferably 5 μm or more and 50 μm or less, more preferably 8 μm or more and 40 μm or less, particularly preferably 10 μm or more and 30 μm or less.

The charge-transporting layer may be formed by preparing a coating liquid for a charge-transporting layer containing the above-mentioned respective materials and a solvent, forming a coat of the liquid, and drying the coat. Examples of the solvent to be used for the coating liquid include an alcohol-based solvent, a ketone-based solvent, an ether-based solvent, an ester-based solvent and an aromatic hydrocarbon-based solvent. Of those solvents, an ether-based solvent or an aromatic hydrocarbon-based solvent is preferred.

(2) Single-Layer Photosensitive Layer

The single-layer photosensitive layer may be formed by preparing a coating liquid for a photosensitive layer containing the charge-generating substance, the charge-transporting substance, a resin, and a solvent, forming a coat of the liquid, and drying the coat. Examples of the charge-generating substance, the charge-transporting substance and the resin are the same as those of the materials in the section “(1) Laminated Photosensitive Layer.”

<Protective Layer>

In the present invention, a protective layer is provided on the photosensitive layer.

The protective layer has a binding resin and a metal oxide particle according to the first aspect or the second aspect of the present invention. In the second aspect, further preferably, niobium is further contained in the coating layer of the metal oxide particle.

In the first aspect of the present invention, the coating layer is required to contain niobium.

The core of the metal oxide particle may not contain niobium. If niobium is present uniformly in the entire metal oxide particle, the particle functions as a charge trap to thereby degrade the charging ability. Accordingly, the niobium content ratio based on the total mass of the coating layer is required to be higher than the niobium content ratio based on the total mass of the core. In this case, the niobium content ratio based on the total mass of the coating layer is preferably 10 times or more the niobium content ratio based on the total mass of the core. The content of niobium is preferably 0.5% by mass or more, more preferably 2.0% by mass or more based on the total mass of the coating layer. The content is further preferably 5.0% by mass or more and 15.0% by mass or less.

The content of niobium in the metal oxide particle is preferably 2.6% by weight or more based on the total mass of the metal oxide particle. The content is more preferably 2.6% by weight or more and 10.0% by weight or less.

When the particle satisfies the above expression (1) and expression (2), the oxygen deficiency rate A of the entire metal oxide particle is more preferably 1.0% or less, more preferably 0.5% or less in the present invention.

In the metal oxide particle of the present invention, a higher oxygen deficiency rate of the coating layer, that is, a larger C/B value indicates that the coating layer is more selectively oxygen-deficient.

In consideration of oxygen deficiencies of which uniform presence in the entire metal oxide particle causes the particle to function as a charge trap to thereby degrade the charging ability, C/B is required to be larger than 10 and is further preferably 20 or more so as to exert the effects of the present invention. The core of the metal oxide particle may not be oxygen-deficient at all.

In the present invention, the amount of niobium in the coating layer of the metal oxide particle and the ratio between the oxygen deficiency rate of the coating layer and the oxygen deficiency rate of the core of the metal oxide particle can be measured by energy dispersive X-ray analysis (EDX).

In the present invention, the amount of niobium in the coating layer of the metal oxide particle and the ratio between the oxygen deficiency rate of the coating layer and the oxygen deficiency rate of the core of the metal oxide particle were measured by SEM-EDX analysis on the cross section of the metal oxide particle.

In the present invention, the oxygen deficiency rate of the metal oxide particle can be determined by thermogravimetry (TG). When the metal oxide particle of the present invention is heated under an oxygen atmosphere, the mass decreases immediately after temperature rising is started due to the influence of desorption of moisture and the like adsorbed on the surface of the metal oxide particle. Thereafter, the mass starts to increase at a certain temperature. The mass at the time when the mass turns from decrease to increase is taken as the minimum mass, and a difference from the maximum mass was obtained during heating thereafter. The difference is caused by bonding of the oxygen deficient site of the titanium oxide particle to oxygen.

In the present invention, the oxygen deficiency rate of the metal oxide particle was measured using a thermogravimetric apparatus (trade name: Q5000IR, manufactured by TA Instruments). The temperature rising rate during measurement was 10° C./minute, and the measurement was performed under a flow of oxygen. The mass at a temperature at which the mass turns to increase in the range of 300° C. to 900° C. was taken as the minimum mass, and the oxygen deficiency rate A was determined from the minimum mass and the maximum mass during heating thereafter.

The proportion of the titanium element contained in the core of the metal oxide particle (% by mass) can also be determined by conducting ICP emission analysis on a powder of a material identical to that of the particle used in the core. A solution obtained by dissolving the material with an acid such as sulfuric acid is measured.

In the present invention, cores of various shapes, such as a spherical shape, a polyhedral shape, an ellipsoidal shape, a flaky shape and a needle shape may be used as the core of the metal oxide particle. Of those, a core of a spherical shape, a polyhedral shape or an ellipsoidal shape is preferably used from the viewpoint that the occurrence of an image defect, such as a black spot, is reduced. Further, the core is more preferably of a spherical shape or a polyhedral shape close to a spherical shape. As the core of the metal oxide particle, a titanium oxide particle may be preferably used.

In the present invention, the core and the coating layer preferably contain an anatase-type titanium oxide or a rutile-type titanium oxide. Furthermore, the core and the coating layer more preferably contain an anatase-type titanium oxide and are particularly preferably formed of an anatase-type titanium oxide. When an anatase-type titanium oxide is used, a fluctuation in the light potential is more unlikely to occur.

In the present invention, the average primary particle size of the metal oxide particle is preferably 30 nm or more and 500 nm or less. When the average primary particle size of the metal oxide particle is 30 nm or more, reaggregation of the particle is more unlikely to occur after a coating liquid for a protective layer is prepared. If the reaggregation of the particle occurs, the stability of the coating liquid for a protective layer is likely to decrease, or a crack is likely to occur in the surface of the protective layer to be formed. When the average primary particle size of the metal oxide particle is 500 nm or less, the surface of the protective layer is unlikely to be roughened. If the surface of the protective layer is roughened, image exposure is scattered, and thus degradation in the image quality is likely to occur.

Furthermore, in the present invention, the average primary particle size of the metal oxide particle is more preferably 30 nm or more and 400 nm or less.

In the present invention, the average primary particle size D1 of the metal oxide particle was determined using a scanning electron microscope as described below. The particle to be measured was observed with a scanning electron microscope S-4800 manufactured by Hitachi, Ltd., and the respective particle sizes of 100 particles selected from an image obtained through the observation were measured. The arithmetic average of the particle sizes was calculated and defined as the average primary particle size D1. The respective particle sizes were defined as "(a+b)/2", wherein a is the longest side and b is the shortest side of a primary particle. In a needle-shaped metal oxide particle or a flaky titanium oxide particle, an average particle size was calculated for each of a long axis diameter and a short axis diameter to determine average primary particle size.

In the present invention, the surface of the metal oxide particle may be treated with a silane coupling agent or the like.

In the present invention, the content of the metal oxide particle is preferably 33% by volume or more, more preferably 50% by volume or more based on the total volume of the protective layer.

When the range is satisfied, the contact probability among metal oxide particles in the protective layer increases. Then, conductive paths generated by niobium and oxygen deficiencies in the coating layer are more likely to be connected, and thus an effect of preventing charge retention is improved.

The present protective layer may contain a charge-transporting substance, and examples of the charge-transporting substance include a polycyclic aromatic compound, a heterocyclic compound, a hydrazone compound, a styryl compound, an enamine compound, a benzidine compound, a triarylamine compound and a resin having a group derived from each of those substances. Of those, a triarylamine compound and a benzidine compound are preferred.

Examples of the binding resin include a polyester resin, an acrylic resin, a phenoxy resin, a polycarbonate resin, a polystyrene resin, a phenol resin, a melamine resin and an epoxy resin. Of those, a polycarbonate resin, a polyester resin and an acrylic resin are preferred.

The protective layer may be formed as a cured film by polymerizing a composition containing a monomer having a polymerizable functional group. Examples of reaction at that time include a thermal polymerization reaction, a photopolymerization reaction and a radiation polymerization reaction. Examples of the polymerizable functional group included in the monomer having a polymerizable functional group include an acrylic group and a methacrylic group. A material having charge transportability may be used as the monomer having a polymerizable functional group.

The present protective layer may contain an additive, such as an antioxidant, a UV absorber, a plasticizer, a leveling agent, a lubricity-imparting agent or a wear resistance-improving agent. Specific examples thereof include a hindered phenol compound, a hindered amine compound, a sulfur compound, a phosphorus compound, a benzophenone compound, a siloxane-modified resin, a silicone oil, a fluorine resin particle, a polystyrene resin particle, a polyethylene resin particle, a silica particle, an alumina particle, and a boron nitride particle.

The average thickness of the protective layer is preferably 0.3 μm or more and 10 μm or less, and preferably 0.5 μm or more and 7 μm or less.

The protective layer may be formed by preparing a coating liquid for a protective layer containing the above-mentioned respective materials and a solvent, forming a coat of the liquid, and drying and/or curing the coat. Examples of the solvent to be used for the coating liquid include an alcohol-based solvent, a ketone-based solvent, an ether-based solvent, a sulfoxide-based solvent, an ester-based solvent and an aromatic hydrocarbon-based solvent.

[Process Cartridge and Electrophotographic Apparatus]

A process cartridge of the present invention integrally supports the electrophotographic photosensitive member that has been described above, and at least one unit selected from the group consisting of a charging unit, a developing unit, a transferring unit and a cleaning unit, and is removably mounted onto the main body of an electrophotographic apparatus.

An electrophotographic apparatus of the present invention includes the electrophotographic photosensitive member that has been described above, a charging unit, an exposing unit, a developing unit and a transferring unit.

An example of the schematic construction of an electrophotographic apparatus having a process cartridge including an electrophotographic photosensitive member is illustrated in FIGURE.

A cylindrical electrophotographic photosensitive member 1 is rotationally driven at a predetermined peripheral speed in a direction indicated by the arrow about an axis 2 as a center. The surface of the electrophotographic photosensitive member 1 is charged to a predetermined positive or negative potential by a charging unit 3. In the FIGURE, a roller charging system based on a roller-type charging member is illustrated, but a charging system, such as a corona charging system, a proximity charging system or an injection charging system, may be adopted. The charged surface of the electrophotographic photosensitive member 1 is irradiated with exposure light 4 from an exposing unit (not illustrated), and an electrostatic latent image corresponding to target image information is formed thereon. The electrostatic latent image formed on the surface of the electrophotographic photosensitive member 1 is developed with toner stored in a developing unit 5, and a toner image is formed on the surface of the electrophotographic photosensitive member 1. The toner image formed on the surface of the electrophotographic photosensitive member 1 is transferred onto a transfer material 7 by a transferring unit 6. The transfer material 7 onto which the toner image has been transferred is conveyed to a fixing unit 8, is subjected to a treatment for fixing the toner image and is printed out to the outside of the electrophotographic apparatus. The electrophotographic apparatus may have a cleaning unit 9 for removing a deposit, such as the toner remaining on the surface of the electrophotographic photosensitive member 1 after the transfer. Alternatively, a so-called cleaner-less system, which removes the deposit with the developing unit or the like without arrangement of a separate cleaning unit, may be used. The electrophotographic apparatus may have an electricity-removing mechanism, which subjects the surface of the electrophotographic photosensitive member 1 to an electricity-removing treatment with pre-exposure light 10 from a pre-exposing unit (not illustrated). In addition, a guiding unit 12, such as a rail, may be provided for removably mounting the process cartridge 11 of the present invention onto the main body of the electrophotographic apparatus.

The electrophotographic photosensitive member of the present invention can be used in, for example, a laser beam printer, an LED printer, a copying machine, a facsimile and a multifunctional peripheral thereof.

EXAMPLES

The present invention is described in more detail below by way of Examples and Comparative Examples. The present invention is by no means limited to the following Examples unless departing from the gist thereof. In the following Examples, "part(s)" is by mass unless otherwise specified.

Production of Metal Oxide Particle

Production Example 1

(Metal Oxide Particle A1)

Titanium dioxide as the core may be produced by a known sulfuric acid method. That is, a solution including titanium sulfate and titanyl sulfate is hydrolyzed by heating to prepare a metatitanic acid slurry. Drying and calcining the metatitanic acid slurry can provide the titanium dioxide.

An anatase-type titanium oxide particle having an average primary particle size of 150 nm, in which no niobium is detected, was used as the core particle. One hundred grams of the core was dispersed in water to form 1 L of an aqueous suspension, and the suspension was heated to 60° C. To the suspension, a titanium-niobium acid solution prepared by mixing a niobium solution of 3.1 g of niobium pentachloride ($NbCl_5$) dissolved in 100 mL of 11.4 mol/L hydrochloric acid with 600 mL of a titanium sulfate solution containing 33.7 g of Ti, and a 10.7 mol/L sodium hydroxide solution were simultaneously added dropwise (added in parallel) over 3 hours so that the suspension had a pH of 2 to 3. After completion of the dropwise addition, the pH was adjusted to near-neutral, and a flocculant was added thereto to settle the solid. The supernatant was removed, the remainder was filtered, and the residue was washed and dried at 110° C. to obtain an intermediate containing 0.1 wt % of organic matter derived from the flocculant in terms of C. The intermediate was treated in nitrogen gas at 800° C. to prepare a metal oxide particle A1 having an average primary particle size of 190 nm.

(Metal Oxide Particles A2 to A9, B1 to B6 and C1 to C6)

Metal oxide particles A2 to A9, B1 to B6 and C1 to C6 having titanium oxide were produced in the same manner as in Production Example 1 except that the core used and the conditions in coating were changed in the production of the metal oxide particle A1.

Comparative Production Example 1

A powder of a particle R1 having titanium oxide, which was a rutile-type titanium oxide particle having an average primary particle size of 200 nm, was obtained according to Japanese Patent Application Laid-Open No. 2007-334334.

Comparative Production Example 2

A powder of a particle R2 having titanium oxide, which was an anatase-type titanium oxide particle having an average primary particle size of 180 nm and having a niobium content of 1.0 wt %, was obtained according to Japanese Patent Application Laid-Open No. 2005-17470.

TABLE 1

| | Core particle | | Coating layer | | | Entire particle | |
|---|---|---|---|---|---|---|---|
| Metal oxide particle No. | Crystal type of core | Average particle size of core (nm) | Niobium doping | Niobium content based on total mass of coating layer (% by mass) | Average thickness of coating layer (nm) | Oxygen deficiency rate of entire particle (%) | Oxygen deficiency rate of coating layer/Oxygen deficiency rate of core |
| Metal oxide particle A1 | Anatase | 150 | Yes | 5.2% | 20 | 0.5 | 25 |
| Metal oxide particle A2 | Anatase | 150 | Yes | 5.2% | 20 | 1.1 | 44 |
| Metal oxide particle A3 | Anatase | 150 | Yes | 5.2% | 20 | 0.3 | 17 |
| Metal oxide particle A4 | Anatase | 150 | Yes | 5.2% | 20 | 0.03 | 12 |
| Metal oxide particle A5 | Anatase | 150 | Yes | 5.2% | 20 | 2.0 | 60 |
| Metal oxide particle A6 | Anatase | 150 | Yes | 4.7% | 20 | 0.8 | 32 |
| Metal oxide particle A7 | Anatase | 150 | Yes | 2.0% | 20 | 0.5 | 25 |
| Metal oxide particle A8 | Anatase | 150 | Yes | 10.6% | 20 | 0.5 | 25 |
| Metal oxide particle A9 | Rutile | 150 | Yes | 2.0% | 20 | 0.3 | 15 |
| Metal oxide particle B1 | Anatase | 150 | Yes | 5.2% | 20 | — | — |
| Metal oxide particle B2 | Anatase | 150 | Yes | 4.7% | 20 | — | — |
| Metal oxide particle B3 | Anatase | 150 | Yes | 2.0% | 20 | — | — |
| Metal oxide particle B4 | Anatase | 150 | Yes | 10.3% | 20 | — | — |
| Metal oxide particle B5 | Anatase | 150 | Yes | 15.0% | 20 | — | — |
| Metal oxide particle B6 | Rutile | 150 | Yes | 2.0% | 20 | — | — |
| Metal oxide particle C1 | Anatase | 150 | No | — | 20 | 0.5 | 14 |
| Metal oxide particle C2 | Anatase | 150 | No | — | 20 | 1.1 | 21 |
| Metal oxide particle C3 | Anatase | 150 | No | — | 20 | 0.3 | 13 |
| Metal oxide particle C4 | Anatase | 150 | No | — | 20 | 0.03 | 7 |
| Metal oxide particle C5 | Anatase | 150 | No | — | 20 | 2.0 | 32 |
| Metal oxide particle C6 | Rutile | 150 | No | — | 20 | 0.5 | 11 |

Preparation of Coating Liquid for Protective Layer (Coating Liquid for Protective Layer A1)

Twenty-two parts of a compound represented by the following structural formula (1) were mixed with a mixed solvent of 144 parts of 2-propanol and 16 parts of tetrahydrofuran. To this solution, 100 parts of a metal oxide particle A1 were added and stirred.

The resultant was placed in a vertical sand mill using 200 parts of a glass bead having an average particle size of 1.0 mm and subjected to a dispersion treatment under conditions of a dispersion liquid temperature of 23±3° C. and a rotating speed of 1,500 rpm (peripheral speed: 5.5 m/s) for 2 hours to obtain a dispersion liquid.

The glass bead was removed from the dispersion liquid with a mesh, and the dispersion liquid obtained was filtered under pressure with PTFE filter paper (trade name: PF-060, manufactured by Advantec Toyo Kaisha, Ltd.) to prepare a coating liquid for a protective layer A1.

(1)

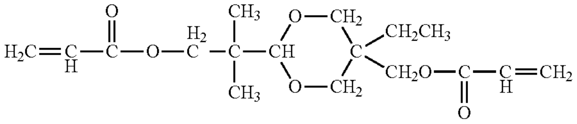

(Coating Liquids for Protective Layer A2 to A13, B1 to B10, C1 to C10 and R1 to R2)

Coating liquids for a protective layer A2 to A13, B1 to B10, C1 to C10 and R1 to R2 were each prepared by the same operation as that of the preparation of the coating liquid for a protective layer A1 except that the type and amount (parts by mass) of the metal oxide particle used for the preparation of the coating liquid for a protective layer A1 were each changed as shown in Table 2.

(Coating Liquid for Protective Layer A14)

A coating liquid for a protective layer A14 was prepared by performing a dispersion treatment in the same manner as for the coating liquid for a protective layer A1, using 22 parts of the acrylic monomer represented by the above structural formula (1), 7 parts of 2-methyl thioxanthone as a photoinitiator, 100 parts of the metal oxide particle A1 and 160 parts of ethanol.

TABLE 2

| Coating liquid for protective layer No. | Metal oxide particle No. | Amount of particle used (parts by mass) |
|---|---|---|
| Coating liquid for protective layer A1 | Metal oxide particle A1 | 100 |
| Coating liquid for protective layer A2 | Metal oxide particle A2 | 100 |
| Coating liquid for protective layer A3 | Metal oxide particle A3 | 100 |
| Coating liquid for protective layer A4 | Metal oxide particle A4 | 100 |
| Coating liquid for protective layer A5 | Metal oxide particle A5 | 100 |
| Coating liquid for protective layer A6 | Metal oxide particle A6 | 100 |
| Coating liquid for protective layer A7 | Metal oxide particle A7 | 100 |
| Coating liquid for protective layer A8 | Metal oxide particle A8 | 100 |
| Coating liquid for protective layer A9 | Metal oxide particle A9 | 100 |
| Coating liquid for protective layer A10 | Metal oxide particle A1 | 50 |
| Coating liquid for protective layer A11 | Metal oxide particle A1 | 80 |
| Coating liquid for protective layer A12 | Metal oxide particle A1 | 150 |
| Coating liquid for protective layer A13 | Metal oxide particle A1 | 200 |
| Coating liquid for protective layer A14 | Metal oxide particle A1 | 100 |
| Coating liquid for protective layer B1 | Metal oxide particle B1 | 100 |
| Coating liquid for protective layer B2 | Metal oxide particle B2 | 100 |
| Coating liquid for protective layer B3 | Metal oxide particle B3 | 100 |
| Coating liquid for protective layer B4 | Metal oxide particle B4 | 100 |
| Coating liquid for protective layer B5 | Metal oxide particle B5 | 100 |
| Coating liquid for protective layer B6 | Metal oxide particle B6 | 100 |
| Coating liquid for protective layer B7 | Metal oxide particle B1 | 50 |
| Coating liquid for protective layer B8 | Metal oxide particle B1 | 80 |
| Coating liquid for protective layer B9 | Metal oxide particle B1 | 150 |
| Coating liquid for protective layer B10 | Metal oxide particle B1 | 200 |
| Coating liquid for protective layer C1 | Metal oxide particle C1 | 100 |
| Coating liquid for protective layer C2 | Metal oxide particle C2 | 100 |
| Coating liquid for protective layer C3 | Metal oxide particle C3 | 100 |
| Coating liquid for protective layer C4 | Metal oxide particle C4 | 100 |
| Coating liquid for protective layer C5 | Metal oxide particle C5 | 100 |
| Coating liquid for protective layer C6 | Metal oxide particle C6 | 100 |
| Coating liquid for protective layer C7 | Metal oxide particle C1 | 50 |
| Coating liquid for protective layer C8 | Metal oxide particle C1 | 80 |
| Coating liquid for protective layer C9 | Metal oxide particle C1 | 150 |

TABLE 2-continued

| Coating liquid for protective layer No. | Metal oxide particle No. | Amount of particle used (parts by mass) |
|---|---|---|
| Coating liquid for protective layer C10 | Metal oxide particle C1 | 200 |
| Coating liquid for protective layer R1 | Metal oxide particle R1 | 100 |
| Coating liquid for protective layer R2 | Metal oxide particle R2 | 100 |

Production of Electrophotographic Photosensitive Member (Electrophotographic Photosensitive Member 1)

An aluminum cylinder having a diameter of 24 mm and a length of 257.5 mm (JIS-A3003, aluminum alloy) was used as a support (conductive support).

An aluminum cylinder having a length of 260.5 mm and a diameter of 30 mm (JIS-A3003, aluminum alloy) was used as a support (conductive support).

Next, 50 parts of a titanium oxide particle coated with oxygen-deficient tin oxide (powder resistivity: 120 Ω·cm, coverage of tin oxide: 40%), 40 parts of a phenolic resin (PLYOPHEN J-325, manufactured by DIC Corporation, resin solid content: 60%) and 55 parts of methoxypropanol were placed in a sand mill using a glass bead having a diameter of 1 mm and subjected to a dispersion treatment for 3 hours to prepare a coating liquid for a conductive layer.

The average particle size of the titanium oxide particle coated with oxygen-deficient tin oxide in the coating liquid for a conductive layer was measured using a particle size distribution analyzer manufactured by Horiba, Ltd. (trade name: CAPA700) by a centrifugal sedimentation method at a rotating speed of 5,000 rpm using tetrahydrofuran as a dispersion medium. As a result, the average particle size was 0.30 μm.

The coating liquid for a conductive layer was applied onto the support by dip coating, and the resulting coat was dried at 160° C. for 30 minutes, thereby forming a conductive layer having a thickness of 30 μm.

Next, the following materials were dissolved in a mixed solvent of 50 parts of 1-methoxy-2-propanol and 50 parts of tetrahydrofuran.

Compound represented by the formula (2): 3.36 parts

Styrene-acrylic resin as a polyolefin resin (trade name: UC-3920, manufactured by Toagosei Co., Ltd.): 0.35 parts Blocked isocyanate compound as an isocyanate compound (trade name: SBB-70P, manufactured by Asahi Kasei Corporation): 6.40 parts To this solution, 1.8 parts of a silica slurry dispersed in isopropyl alcohol (trade name: IPA-S T-UP, manufactured by Nissan Chemical Industries, Ltd., concentration of solid content: 15% by mass, viscosity: 9 mPa-s) were added, and the mixture was stirred for 1 hour. Thereafter, the resultant was filtered under pressure using a polytetrafluoroethylene filter manufactured by ADVANTEC (trade name: PF020).

The coating liquid for an undercoat layer thus obtained was applied onto the conductive layer by dip coating, and the resulting coat was cured (polymerized) by heating at 170° C. for 40 minutes to thereby form an undercoat layer having a thickness of 0.7 μm.

(2)

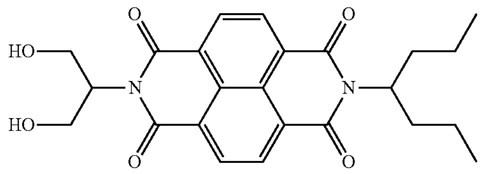

Next, a hydroxygallium phthalocyanine crystal (charge-generating substance) of a crystal form having peaks at Bragg angles (2θ±0.2°) of 7.5°, 9.9°, 12.5°, 16.3°, 18.6°, 25.1° and 28.3° in CuKα characteristic X-ray diffraction was provided. Eight parts of the hydroxygallium phthalocyanine crystal, 4 parts of polyvinyl butyral (trade name: S-LEC BX-1, manufactured by Sekisui Chemical Co., Ltd.) and 250 parts of cyclohexanone were placed in a sand mill using a glass bead having a diameter of 1 mm and subjected to a dispersion treatment for 2 hours. Next, 250 parts of ethyl acetate was added thereto to thereby prepare a coating liquid for a charge-generating layer.

The coating liquid for a charge-generating layer was applied onto the undercoat layer by dip coating to form a coat, and the resulting coat was dried at 95° C. for 10 minutes, thereby forming a charge-generating layer having a thickness of 0.2 μm.

Next, 6 parts of an amine compound (hole-transporting substance) represented by the following formula (3), 2 parts of an amine compound (hole-transporting substance) represented by the following formula (4) and 10 parts of a polyester resin having a weight average molecular weight (Mw) of 100,000 having structural units represented by the following formulas (5) and (6) at a proportion of 5/5 were dissolved in a mixed solvent of 40 parts of dimethoxymethane and 60 parts of chlorobenzene to thereby prepare a coating liquid for a charge-transporting layer.

(3)

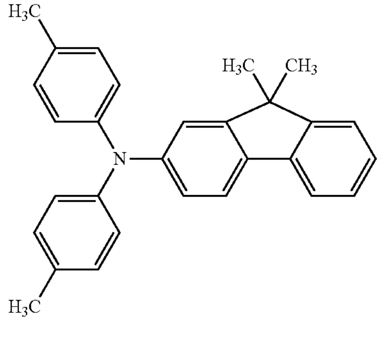

(4)

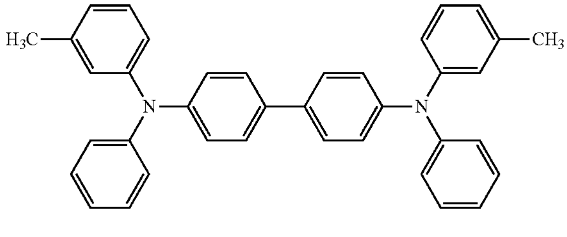

-continued (5)

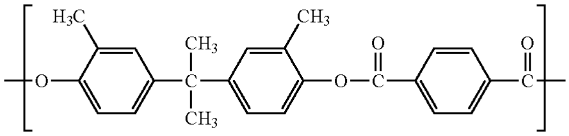

(6)

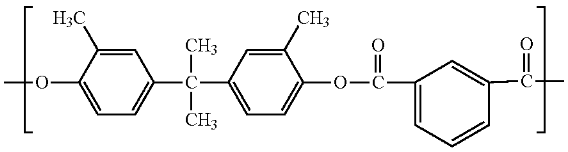

The coating liquid for a charge-transporting layer was applied onto the charge-generating layer by dip coating, and the resulting coat was dried at 120° C. for 40 minutes, thereby forming a charge-transporting layer having a thickness of 22 μm.

Next, the coating liquid for a protective layer A1 was applied onto the charge-transporting layer by dip coating to form a coat, and the resulting coat was dried at 50° C. for 6 minutes. Thereafter, under a nitrogen atmosphere, the coat was irradiated with electron beams for 1.6 seconds under conditions of an acceleration voltage of 70 kV and a beam current of 2.0 mA while the support (body to be irradiated) was rotated at a speed of 300 rpm. An oxygen concentration at the time of the electron beam irradiation was 810 ppm. Next, the coat was naturally cooled in air until the temperature of the coat became 25° C. Then, the coat was subjected to a heat treatment under such a condition that the temperature of the coat became 120° C. for an hour to thereby form a protective layer having a thickness of 3 μm. Thus, a cylindrical (drum-shaped) electrophotographic photosensitive member of Example 1 having the protective layer was prepared.

(Electrophotographic Photosensitive Members 2 to 33 and Electrophotographic Photosensitive Members R1 to R2)

Electrophotographic photosensitive members were each prepared in the same manner as in Example 1 except that, in respect of the coating liquid for a protective layer used in production of the electrophotographic photosensitive member, the coating liquid for a protective layer A1 was replaced by each of coating liquids for a protective layer A2 to A14, B1 to B10, C1 to C10 and R1 to R2.

(Electrophotographic Photosensitive Member 34)

An electrophotographic photosensitive member was prepared in the same manner as in Example 1 except that a coating liquid for a protective layer 34 was used and applied onto the charge-transporting layer by dip coating, and after the coat was dried, the coat was ultraviolet-irradiated using a high-pressure mercury lamp at a light intensity of 250 $W/cm^2$ for 60 seconds and dried with hot air at 120° C. for 2 hours to form a protective layer having a thickness of 3 μm.

(Analysis of Protective Layer of Electrophotographic Photosensitive Member)

From each of the electrophotographic photosensitive members produced above, 5 pieces having a size of 5 mm square were cut to prepare 5 sample pieces for observation for each electrophotographic photosensitive member.

First, for each of the electrophotographic photosensitive members, using one of the sample pieces and a focused ion beam processing observation apparatus (trade name:

FB-2000A, manufactured by Hitachi High-Tech Manufacturing & Service Corporation), the protective layer was sliced into a thickness: 150 nm according to an FIB-μ sampling method. Using a field emission electron microscope (HRTEM) (trade name: JEM-2100F, manufactured by JEOL, Ltd.) and an energy dispersive X-ray spectrometer (EDX) (trade name: JED-2300T, manufactured by JEOL, Ltd.), the protective layer was subjected to composition analysis. The EDX measurement conditions are an accelerating voltage: 200 kV and a beam diameter: 1.0 nm.

From the resultant EDX image, 100 metal oxide particles were selected. The diameters of the cores of the respective particles and the thicknesses of the coating layers thereof were determined. From the arithmetic average thereof, the ratio between the average primary particle size of the cores and the average thickness of the coating layers was calculated. Accordingly, metal oxide particles having an average thickness of the coating layers of 20 nm and an average primary particle size of the cores of 150 nm will have an average primary particle size of 190 nm.

Next, using the remaining 4 sample pieces of each electrophotographic photosensitive member, each of the protective layers were three-dimensionalized into a size of 2 μm×2 μm×2 μm by the Slice & View of an FIB-SEM. The content of the particle based on the total volume of the protective layer was calculated from a difference in contrast by the Slice & View of the FIB-SEM. In the present example, conditions for the Slice & View were set as follows.

Processing of sample for analysis: FIB method
Processing and observation apparatus: NVision 40 manufactured by SII/Zeiss
Slice spacing: 10 nm
Observation conditions:
Acceleration voltage: 1.0 kV
Sample tilt: 540
WD: 5 mm
Detector: BSE detector
Aperture: 60 μm, high current
ABC: ON
Image resolution: 1.25 nm/pixel The analysis is performed on a region of 2 μm in length×2 μm in width, and information for each cross-section is integrated to determine the volume V per 2 μm in length×2 μm in width×2 μm in thickness (8 $\mu m^3$). The measurement environment has a temperature: 23° C. and a pressure: $1\times10^{-4}$ Pa. As the processing and observation apparatus, Strata 400S (sample tilt: 52°) manufactured by FEI Company also may be used. The information for each cross-section was obtained by subjecting the area of a specified titanium oxide particle of the present invention or of a specified titanium oxide particle used in each Comparative Example to image analysis. The image analysis was performed with image processing software: Image-Pro Plus manufactured by Media Cybernetics Inc.

The volume V of the titanium oxide particle of the present invention or of the titanium oxide particle used in each Comparative Example in a volume of 2 μm×2 μm×2 μm (unit volume: 8 $\mu m^3$) in each of the 4 sample pieces was determined based on the information obtained. Then, the value of (V $\mu m^3$/8 $\mu m^3\times100$) was calculated. The average of the values of (V $\mu m^3$/8 $\mu m^3\times100$) in the 4 sample pieces was defined as the content [% by volume] of the titanium oxide particle of the present invention or of the titanium oxide particle used in each Comparative Example in the protective layer based on the total volume of the protective layer. The results are shown in Table 3.

<Evaluation>

First, the photosensitive members of the electrophotographic photosensitive members 1 to 34 and R1 to R2 prepared were used to evaluate the charging ability during repeated use under the following conditions.

When the charging ability deteriorates, the dark potential (Vd) decreases and fogging increases.

As the electrophotographic apparatus, a modified machine of HP LaserJet Enterprise Color M 553dn (trade name), which was a laser beam printer manufactured by Hewlett-Packard Company, was used. The electrophotographic apparatus used for the evaluation was modified so as to adjust and measure an image exposure amount and a developing bias.

First, the exposure amount was adjusted such that the light potential of the electrophotographic photosensitive member of each of Examples and Comparative Examples was −180 V, and then, the dark potential (Vd) was measured.

Thereafter, the developing bias Vdc was adjusted so as to be −450 V, and the photosensitive member was mounted on the cyan cartridge of the electrophotographic apparatus.

Thereafter, a solid white image was outputted with the single cyan color on A4 size plain paper under an environment of temperature: 23° C./relative humidity: 50%.

For fogging evaluation, the reflectance of the white portion of the above image and of the reflectance of virgin paper were measured with a whiteness photometer (trade name: REFLECTMETER TC-6DS/A, manufactured by Tokyo Denshoku, Co., Ltd.), and the difference between both the reflectances was taken as the fogging. Using an equation of virgin paper reflectance—reflectance of white portion of image=fogging %, fogging of 2.0% or more was evaluated as NG. The results are shown in Table 3.

TABLE 3

| | | | | | Coating layer, niobium doping | | Oxygen deficiency | | | |
|---|---|---|---|---|---|---|---|---|---|---|
| | Electrophotographic photosensitive member No. | Coating liquid for protective layer No. | Particle content based on total volume of protective layer (% by volume) | Thickness (μm) | Niobium doping | Niobium content based on total mass of coating layer (% by mass) | Oxygen deficiency rate of entire particle (%) | Oxygen deficiency rate of coating layer/Oxygen deficiency rate of core | Vd (-V) | Fogging |
| Example 1 | Electrophotographic photosensitive member 1 | Coating liquid for protective layer A1 | 50 | 3 | Yes | 5.2% | 0.5 | 25 | 700 | 0.8% |
| Example 2 | Electrophotographic photosensitive member 2 | Coating liquid for protective layer A2 | 50 | 3 | Yes | 5.2% | 1.1 | 44 | 660 | 0.9% |

TABLE 3-continued

| | | | | | Coating layer, niobium doping | | Oxygen deficiency | | | |
|---|---|---|---|---|---|---|---|---|---|---|
| | Electrophotographic photosensitive member No. | Coating liquid for protective layer No. | Particle content based on total volume of protective layer (% by volume) | Thickness (μm) | Niobium doping | Niobium content based on total mass of coating layer (% by mass) | Oxygen deficiency rate of entire particle (%) | Oxygen deficiency rate of coating layer/Oxygen deficiency rate of core | Vd (-V) | Fogging |
| Example 3 | Electrophotographic photosensitive member 3 | Coating liquid for protective layer A3 | 50 | 3 | Yes | 5.2% | 0.3 | 17 | 660 | 0.9% |
| Example 4 | Electrophotographic photosensitive member 4 | Coating liquid for protective layer A4 | 50 | 3 | Yes | 5.2% | 0.03 | 12 | 660 | 0.9% |
| Example 5 | Electrophotographic photosensitive member 5 | Coating liquid for protective layer A5 | 50 | 3 | Yes | 5.2% | 2.0 | 60 | 660 | 0.9% |
| Example 6 | Electrophotographic photosensitive member 6 | Coating liquid for protective layer A6 | 50 | 3 | Yes | 4.7% | 0.8 | 32 | 620 | 1.3% |
| Example 7 | Electrophotographic photosensitive member 7 | Coating liquid for protective layer A7 | 50 | 3 | Yes | 2.0% | 0.5 | 25 | 660 | 0.9% |
| Example 8 | Electrophotographic photosensitive member 8 | Coating liquid for protective layer A8 | 50 | 3 | Yes | 10.6% | 0.5 | 25 | 660 | 0.9% |
| Example 9 | Electrophotographic photosensitive member 9 | Coating liquid for protective layer A9 | 50 | 3 | Yes | 2.0% | 0.3 | 15 | 620 | 1.3% |
| Example 10 | Electrophotographic photosensitive member 10 | Coating liquid for protective layer A10 | 25 | 3 | Yes | 5.2% | 0.5 | 25 | 670 | 0.9% |
| Example 11 | Electrophotographic photosensitive member 11 | Coating liquid for protective layer A11 | 40 | 3 | Yes | 5.2% | 0.5 | 25 | 690 | 0.9% |
| Example 12 | photosensitive member Electrophotographic 12 | Coating liquid for protective layer A12 | 75 | 3 | Yes | 5.2% | 0.5 | 25 | 700 | 0.8% |
| Example 13 | Electrophotographic photosensitive member 13 | Coating liquid for protective layer A13 | 100 | 3 | Yes | 5.2% | 0.5 | 25 | 700 | 0.9% |
| Example 14 | Electrophotographic photosensitive member 14 | Coating liquid for protective layer B1 | 50 | 3 | Yes | 5.2% | — | — | 600 | 1.5% |
| Example 15 | Electrophotographic photosensitive member 15 | Coating liquid for protective layer B2 | 50 | 3 | Yes | 4.7% | — | — | 560 | 1.9% |
| Example 16 | Electrophotographic photosensitive member 16 | Coating liquid for protective layer B3 | 50 | 3 | Yes | 2.0% | — | — | 560 | 1.8% |
| Example 17 | Electrophotographic photosensitive member 17 | Coating liquid for protective layer B4 | 50 | 3 | Yes | 10.3% | — | — | 560 | 1.9% |
| Example 18 | Electrophotographic photosensitive member 18 | Coating liquid for protective layer B5 | 50 | 3 | Yes | 15.0% | — | — | 560 | 1.9% |
| Example 19 | Electrophotographic photosensitive member 19 | Coating liquid for protective layer B6 | 50 | 3 | Yes | 2.0% | — | — | 585 | 1.6% |
| Example 20 | Electrophotographic photosensitive member 20 | Coating liquid for protective layer B7 | 25 | 3 | Yes | 5.2% | — | — | 570 | 1.6% |
| Example 21 | Electrophotographic photosensitive member 21 | Coating liquid for protective layer B8 | 40 | 3 | Yes | 5.2% | — | — | 590 | 1.6% |
| Example 22 | Electrophotographic photosensitive member 22 | Coating liquid for protective layer B9 | 75 | 3 | Yes | 5.2% | — | — | 600 | 1.5% |
| Example 23 | Electrophotographic photosensitive member 23 | Coating liquid for protective layer B10 | 100 | 3 | Yes | 5.2% | — | — | 600 | 1.6% |
| Example 24 | Electrophotographic photosensitive member 24 | Coating liquid for protective layer C1 | 50 | 3 | No | — | 0.5 | 14 | 560 | 1.9% |
| Example 25 | Electrophotographic photosensitive member 25 | Coating liquid for protective layer C2 | 50 | 3 | No | — | 1.1 | 21 | 600 | 1.6% |

TABLE 3-continued

| | Electrophotographic photosensitive member No. | Coating liquid for protective layer No. | Particle content based on total volume of protective layer (% by volume) | Thickness (μm) | Coating layer, niobium doping: Niobium doping | Coating layer, niobium doping: Niobium content based on total mass of coating layer (% by mass) | Oxygen deficiency: Oxygen deficiency rate of entire particle (%) | Oxygen deficiency: Oxygen deficiency rate of coating layer/Oxygen deficiency rate of core | Vd (-V) | Fogging |
|---|---|---|---|---|---|---|---|---|---|---|
| Example 26 | Electrophotographic photosensitive member 26 | Coating liquid for protective layer C3 | 50 | 3 | No | — | 0.3 | 13 | 560 | 1.9% |
| Example 27 | Electrophotographic photosensitive member 27 | Coating liquid for protective layer C4 | 50 | 3 | No | — | 0.03 | 7 | 560 | 1.9% |
| Example 28 | Electrophotographic photosensitive member 28 | Coating liquid for protective layer C5 | 50 | 3 | No | — | 2.0 | 32 | 560 | 1.9% |
| Example 29 | Electrophotographic photosensitive member 29 | Coating liquid for protective layer C6 | 50 | 3 | No | — | 0.5 | 11 | 545 | 1.8% |
| Example 30 | Electrophotographic photosensitive member 30 | Coating liquid for protective layer C7 | 25 | 3 | No | — | 0.5 | 14 | 530 | 1.8% |
| Example 31 | Electrophotographic photosensitive member 31 | Coating liquid for protective layer C8 | 40 | 3 | No | — | 0.5 | 14 | 550 | 1.9% |
| Example 32 | Electrophotographic photosensitive member 32 | Coating liquid for protective layer C9 | 75 | 3 | No | — | 0.5 | 14 | 560 | 1.9% |
| Example 33 | Electrophotographic photosensitive member 33 | Coating liquid for protective layer C10 | 100 | 3 | No | — | 0.5 | 14 | 560 | 1.9% |
| Example 34 | Electrophotographic photosensitive member 34 | Coating liquid for protective layer A14 | 50 | 3 | Yes | 5.2% | 0.5 | 25 | 685 | 0.9% |
| Comparative Example 1 | Electrophotographic photosensitive member R1 | Coating liquid for protective layer R1 | 50 | 3 | — | — | — | — | 490 | 5.7% |
| Comparative Example 2 | Electrophotographic photosensitive member R2 | Coating liquid for protective layer R2 | 50 | 3 | — | — | — | — | 498 | 5.3% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-071958, filed Apr. 13, 2020, which is hereby incorporated by reference herein in its entirety.

What is claimed is:

1. An electrophotographic photosensitive member, comprising:
- a support, a conductive layer, a photosensitive layer and a protective layer in this order;
- the protective layer comprising a binding resin and a metal oxide particle;
- the metal oxide particle comprising a core bearing a coating layer;
- the core comprising titanium oxide and niobium; and
- the coating layer comprising titanium oxide, wherein
- the content of the metal oxide particle is at least 33% by volume based on a total volume of the protective layer,
- the content of niobium in the metal oxide particles is 5.0 to 5.2% by mass based on the total mass of the coating layer, and
- A≤1.0 and 20×B<C when A (%) is an oxygen deficiency rate of the metal oxide particle, B (%) is an oxygen deficiency rate of the core and C (%) is an oxygen deficiency rate of the coating layer.

2. The electrophotographic photosensitive member according to claim 1, wherein the coating layer comprises niobium.

3. The electrophotographic photosensitive member according to claim 1, wherein the titanium oxide in the core comprises an anatase-type titanium oxide or a rutile-type titanium oxide.

4. A process cartridge integrally supporting at least one unit selected from the group consisting of a charging unit, a developing unit and a cleaning unit, and being removably mounted onto the main body of an electrophotographic apparatus, the process cartridge comprising:
- an electrophotographic photosensitive member, the electrophotographic photosensitive member comprising a support, a conductive layer, a photosensitive layer and a protective layer in this order;
- the protective layer comprising a binding resin and a metal oxide particle;
- the metal oxide particle comprising a core and a coating layer;
- the core comprising titanium oxide and niobium; and
- the coating layer comprising titanium oxide, wherein
- the content of the metal oxide particle is at least 33% by volume based on a total volume of the protective layer,
- the content of niobium in the metal oxide particles is 5.0 to 5.2% by mass based on the total mass of the coating layer, and A≤1.0 and 20×B<C when A (%) is an oxygen deficiency rate of the metal oxide particle, B (%) is an oxygen deficiency rate of the core and C (%) is an oxygen deficiency rate of the coating layer.

5. An electrophotographic apparatus, comprising:

an electrophotographic photosensitive member, a charging unit, an exposing unit, a developing unit and a transferring unit;

the electrophotographic photosensitive member comprising a support, a conductive layer, a photosensitive layer and a protective layer in this order;

the protective layer comprising a binding resin and a metal oxide particle;

the metal oxide particle comprising a core and a coating layer;

the core comprising titanium oxide and niobium; and the coating layer comprising titanium oxide, wherein the content of the metal oxide particle is at least 33% by volume based on a total volume of the protective layer, the content of niobium in the metal oxide particles is 5.0 to 5.2% by mass based on the total mass of the coating layer, and A≤1.0 and 20×B<C when A (%) is an oxygen deficiency rate of the metal oxide particle, B (%) is an oxygen deficiency rate of the core and C (%) is an oxygen deficiency rate of the coating layer.

6. The electroconductive photosensitive member according to claim 1, wherein the content of the metal oxide particle is at least 40% by volume based on a total volume of the protective layer.

7. The electroconductive photosensitive member according to claim 1, wherein the content of the metal oxide particle is at least 50% by volume based on a total volume of the protective layer.

8. A process cartridge comprising an electrophotographic photosensitive member according to claim 6, wherein the process cartridge integrally supports at least one unit selected from the group consisting of a charging unit, a developing unit and a cleaning unit, and the process cartridge is removably mounted onto the main body of an electrophotographic apparatus.

9. An electrophotographic apparatus comprising an electrophotographic photosensitive member according to claim 6, and an electrophotographic photosensitive member, a charging unit, an exposing unit, a developing unit and a transferring unit.

10. A process cartridge comprising an electrophotographic photosensitive member according to claim 1, wherein the process cartridge integrally supports at least one unit selected from the group consisting of a charging unit, a developing unit and a cleaning unit, and the process cartridge is removably mounted onto the main body of an electrophotographic apparatus.

11. An electrophotographic apparatus comprising an electrophotographic photosensitive member according to claim 1, and an electrophotographic photosensitive member, a charging unit, an exposing unit, a developing unit and a transferring unit.

12. A process cartridge comprising an electrophotographic photosensitive member according to claim 7, wherein the process cartridge integrally supports at least one unit selected from the group consisting of a charging unit, a developing unit and a cleaning unit, and the process cartridge is removably mounted onto the main body of an electrophotographic apparatus.

13. An electrophotographic apparatus comprising an electrophotographic photosensitive member according to claim 7, and an electrophotographic photosensitive member, a charging unit, an exposing unit, a developing unit and a transferring unit.

* * * * *